FIG. I

United States Patent Office 3,533,096
Patented Oct. 6, 1970

3,533,096
CHARACTER DISPLAY SYSTEM
Richard J. Bouchard, Hudson, N.H., assignor to Sanders Associates, Inc., Nashua, N.J., a corporation of Delaware
Filed Sept. 1, 1967, Ser. No. 665,116
Int. Cl. H01j 31/08
U.S. Cl. 340—324
15 Claims

ABSTRACT OF THE DISCLOSURE

A display system displays characters by tracing a succession of strokes. A decoder processes signals identifying each character to be displayed. A logic section responding to the decoder output develops a succession of signals corresponding to simultaneous changes in vertical and horizontal components and blanking condition of successive strokes in a stroke pattern which is distinctive of the character in interest. The logic section then applies these signals selectively to control the vertical and horizontal deflection fields and intensity control of a cathode ray tube. Thereupon, the tube visibly traces only those strokes in the pattern which are necessary to display the particular character.

BACKGROUND OF THE INVENTION

Field of the invention

This invention relates to a character display system. Apparatus of this type is often used in conjunction with a data processing system to provide a display of information such as letters, numbers and other characters according to instructions in the system. For example, the present system can be used to display on a screen the current status of airline ticket reservations for a particular flight or to give a visual presentation of air control information such as aircraft courses and speeds.

We are concerned here specifically with character generating apparatus of the type which traces a character on a display surface such as a cathode ray tube screen or XY recorder paper by generating a string of strokes or vectors which together form the character.

Description of the prior art

One such apparatus of which we are aware generates each character in a set of characters by displaying successively selected strokes from a fixed pattern of strokes. More particularly, this prior apparatus generates deflection signals for tracing on a cathode ray tube a succession of strokes arranged in a fixed pattern. This pattern has all of the strokes needed to form all of the characters in the set to be displayed. In order to trace each character, the system generates the entire stroke pattern. Simultaneously, it processes signals identifying each character to be displayed and develops a set of unblanking signals which unblank the tube only during the tracing of those segments of the fixed pattern which are required to form the character in question.

The above-described system is vastly superior to analog display systems. Not only is it less costly and more reliable, but also it generates characters of superior quality and shape. However, for each character, it must trace all the strokes in the fixed pattern of strokes even though only some of the strokes are to be displayed in forming that character. Actually, many characters may utilize only relatively few of the strokes in the pattern of strokes. Theerfore, the time required to trace the remaining strokes in the pattern is completely wasted. In the display of a complete frame of characters, the lost time may add up to a large part of the total time required to display the frame.

Also, the complexity of the fixed stroke pattern and the time required to completely trace it depend solely on the complexity of the most complicated character in the set. Therefore, the inclusion in the set of a complex or high-quality character requiring many different strokes greatly increases the amount of lost time during the tracing of the remaining characters, which on the average require far fewer strokes. As a practical matter, a character display system relying on a fixed pattern of strokes has a fairly limited character repertoire which, in turn, restricts its versatility and ability to display very complex character sets.

In other known systems, each character to be displayed is characterized by a generally unique pattern of strokes executed by the cathode ray tube beam in tracing out the character. In this type of display system described for example in U.S. Pat. Nos. 2,766,444 and 3,047,851, a decoder processes signals identifying each character to be displayed. Then a programming section responding to the decoder output develops trains of equal duration signals corresponding to strokes in the stroke pattern for that character. These signal trains are used to control the deflection fields for the cathode ray tube so that the electron beam therein traces out a sequence of strokes which together make up the character in question. This type of system also develops intensity control signals which turn on the tube's electron beam at the precise times that the deflection fields for the necessary strokes are present.

Conventional systems of the latter type, which trace a distinctive pattern of strokes for each character, have several drawbacks which, as a practical matter, limit their application. Many of these drawbacks stem from the fact that the system requires separate logic elements for controlling the vertical and horizontal components (i.e. direction) and intensity of each stroke used to trace each character being displayed by the system. Actually, many characters in a given set are often composed of several consecutive strokes having the same direction. This means that in some cases, a system capable of handling a character set of even moderate size and complexity carries a relatively large number of somewhat redundant and unnecessary logic elements. This makes it unduly large and bulky, and also relatively expensive to manufacture. It also requires a relatively large degree of "fan-out" of data lines from the character decoder to all of the required logic elements.

Another drawback is the difficulty encountered in altering the prior systems of the second type to handle different character sets.

SUMMARY OF THE INVENTION

Accordingly, this invention aims to provide a display system of the type which traces a distinctive stroke pattern for each character capable of displaying very complex characters on a cathode ray tube screen.

Another object of the invention is to provide a display system having a large character repertoire.

A further object of the invention is to provide a relatively low-cost display system capable of forming characters of high quality.

A further object of the invention is to provide a character generator which requires a minimum number of logic elements to display a given character set.

Another object of the invention is to provide a character generator which can be integrated into existing display systems.

Another object of the invention is to provide a character generator capable of controlling a plurality of remote display units with a minimum number of connections thereto.

A further object of the invention is to provide a character generator which is versatile and easily modified to handle different character sets.

Other objects of the invention will in part be obvious and will in part appear hereinafter.

The invention accordingly comprises the features of construction, combination of elements, and arrangements of parts which will be exemplified in the constructions hereinafter set forth, and the scope of the invention will be indicated in the claims.

Briefly, the illustrated display system displays characters on a surface such as a cathode ray tube screen by tracing a pattern of strokes whose slopes are a function of the character to be traced. The system processes instructions identifying each character to be displayed. Then it generates a single train of timed signals, each of which corresponds to all of the changes in the vector components (i.e. direction) and blanking condition (i.e. whether the electron beam is on or off at the beginning or end of a stroke in the succession of strokes needed to form the character).

The system then applies selected ones of these signals to a pair of integrators which develop sequences of vertical and horizontal deflection voltages capable of moving the electron beam to trace a stroke pattern having all of the strokes required to form the character in question. Also, since the character formation may sometimes involve retracing previous strokes, selected ones of these same signals are applied to the intensity control of the cathode ray tube to turn on the electron beam either during the initial tracing or during the retracing of these strokes.

The remaining characters in the frame are displayed in sequence in the same fashion, yielding a visual presentation of the complete character frame. This display is refreshed in the usual way at a rate which makes the presentation appear continuous to the observer.

Thus, the present system has all the advantages of the variable stroke pattern arrangements vis-a-vis the fixed stroke pattern systems. Also, as compared with prior variable stroke pattern systems, the present system is simpler and requires fewer logic elements, yet it is still quite versatile. Furthermore, it requires fewer connections to a remote display.

DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENTS

Figure 1:
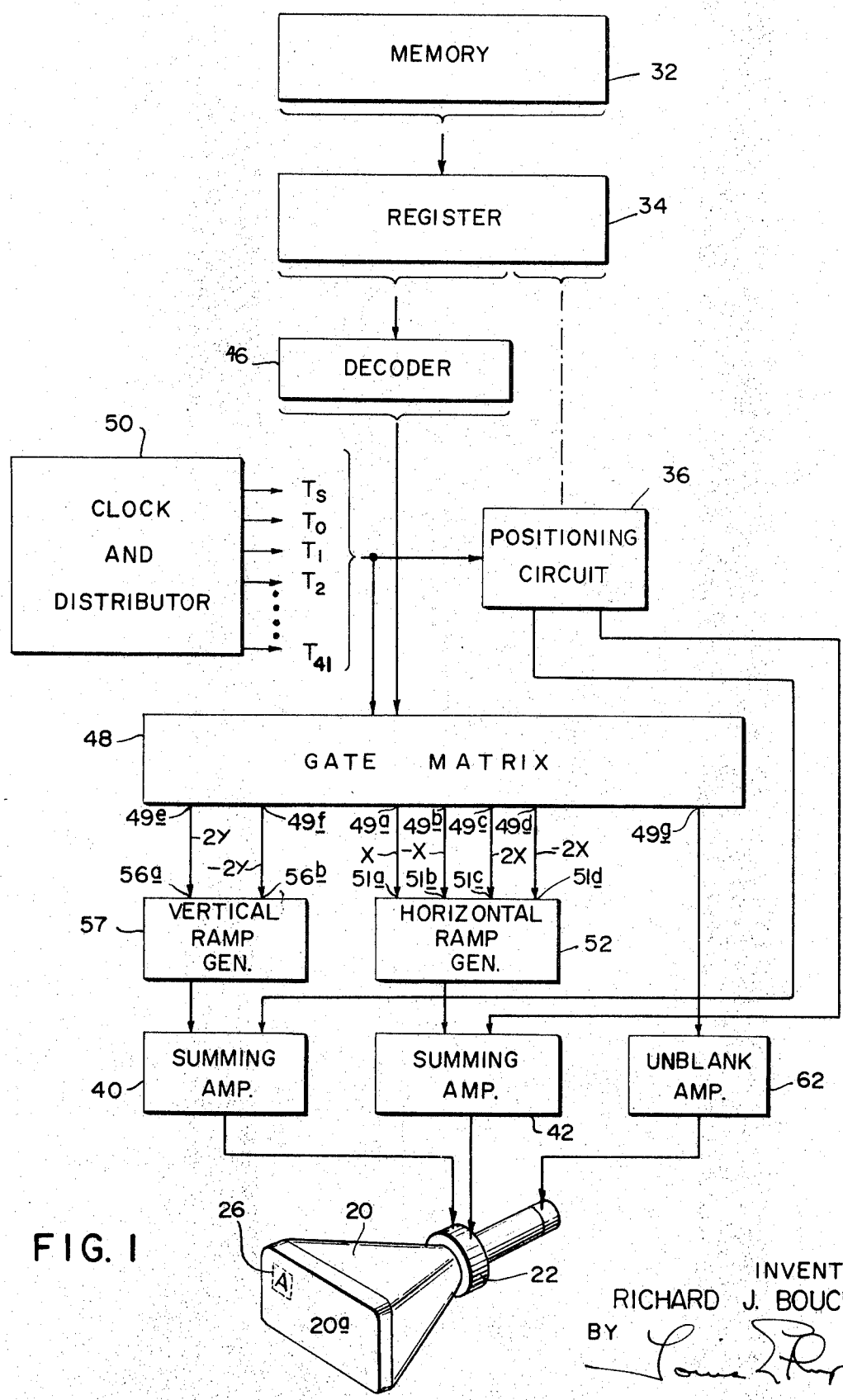
FIG. 1 is a block diagram of a character display system embodying the principles of this invention.

Referring to FIG. 1 of the drawings, my system displays a frame of characters on the screen $20a$ of a cathode ray tube 20. Tube 20 includes a deflector 22 which moves the electron beam vertically and horizontally in response to deflection signals applied to it. The tube 20 also receives unblanking signals that turn on its electron beam. Normally, the tube is blanked so that no trace appears on screen $20a$, even though deflection signals are being applied to deflector 22. When tube 20 receives an unblanking signal, a visible trace appears on screen $20a$ at points thereon corresponding to the positions of the electron beam, and the trace persists as long as the unblanking signal is present.

The apparatus shown in FIG. 1 above tube 20 develops the deflection signals required to generate in succession the stroke pattern for each character in the set of characters the system is capable of displaying. Each stroke pattern has all of the strokes required to visibly trace the corresponding character plus the necessary retraces. For purposes of illustrations, we will describe a system capable of generating stroke patterns composed of as many as twenty-five strokes. In practice, this number of strokes is more than adequate to display all of the characters in the English and Russian alphabets. It will be understood, however, that the illustrated system can be expanded in an obvious way to handle patterns composed of many more strokes.

Simultaneously with the generation of the stroke pattern for each character, the system develops a distinctive set of unblanking signals for that character. These signals unblank tube 20 at the precise times the tube receives the deflection signals for the strokes which must be visibly traced to display the character in question; for example, the letter "A" shown on screen $20a$ in FIG. 1. To wit, the electron gun in tube 20 may be turned off when the tube is retracing previous strokes in a pattern and when the display of each character is completed.

Figure 2:
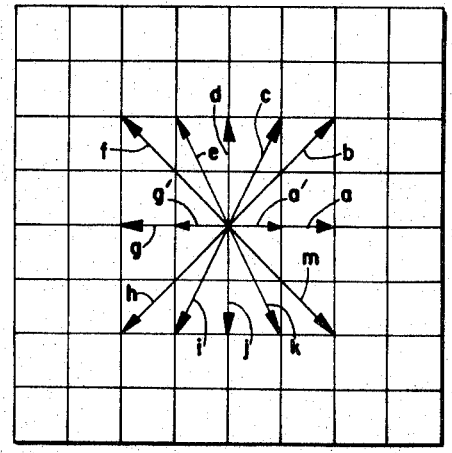
FIG. 2 shows the various types of strokes capable of being traced by the FIG. 1 apparatus.

As shown in FIG. 2, the illustrated system is capable of generating fourteen different strokes having twelve different directions or slopes. Each stroke pattern is composed of a string of one or more of these strokes arranged in a symbol space 26 which corresponds to the dotted line area on screen $20a$ in FIG. 1. The illustrated symbol space 26 consists of an area divided into eight columns and eight rows of squares. The sides of each square correspond to one horizontal stroke increment $x$ or one vertical increment $y$.

The different strokes illustrated in FIG. 2 are identified by the magnitude and direction of their vertical and horizontal vector components as follows:

| | |
|---|---|
| $a$-$(2x, 0)$ | $g$-$(-2x, 0)$ |
| $a'$-$(x, 0)$ | $g'$-$(-x, 0)$ |
| $b$-$(2x, 2y)$ | $h$-$(-2x, -2y)$ |
| $c$-$(x, 2y)$ | $i$-$(-x, -2y)$ |
| $d$-$(0, 2y)$ | $j$-$(0, -2y)$ |
| $e$-$(-x, 2y)$ | $k$-$(x, -2y)$ |
| $f$-$(-2x, 2y)$ | $m$-$(2x, -2y)$ |

For example, the $b$ stroke has a horizontal component of plus two stroke increments $x$ and plus two increments $y$; the $m$ stroke has a horizontal component of plus two increments $x$ and minus two increments $y$. Each stroke may commence at the corner of any square in space 26.

The fourteen different strokes $a$–$k$ and $m$ involve four possible horizontal stroke components, to wit: $x$, $-x$, $2x$ and $-2x$, as well as two vertical components, namely, $2y$ and $-2y$. Thus, the system utilizes horizontal strokes of either one or two increments, but vertical strokes of only two increments. For example, the $e$ stroke has a horizontal component of minus one $x$ increment and plus two $y$ increments; the $f$ stroke has the same vertical component but a horizontal increment of minus two $x$ increments.

The strokes illustrated in FIG. 2 in proper combination yield high-quality presentations of most characters. To form certain special symbols, it may, of course, be desirable to provide also for single increment vertical deflection or to use still other stroke directions from those specifically illustrated herein. This would be but an obvious extension of the illustrated system.

Figure 3A:
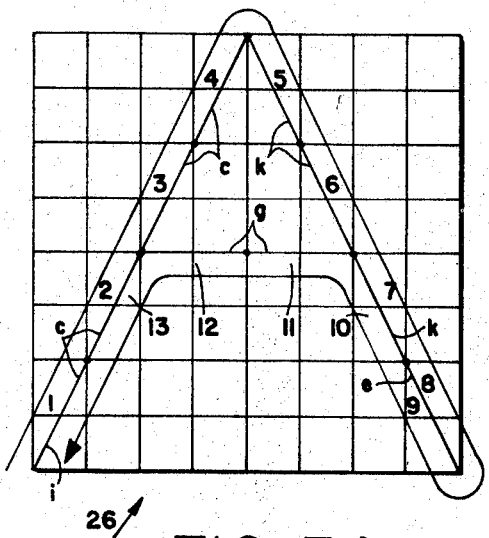
FIG. 3A shows a stroke pattern for a character capable of being generated by the FIG. 1 system.

FIG. 3A shows the stroke pattern for the letter "A" arranged in symbol space 26. By following the arrow and with reference to FIG. 2, one can see that the pattern consists of a string of twelve strokes. Strokes 1–4 are $c$ strokes, strokes 5–8 are $k$ strokes, strokes 9 and 10 are $e$ strokes which retrace strokes 7 and 8 in reverse, and strokes 11 and 12 are $g$ strokes.

The letter "A" is displayed by supplying unblanking signals to tube 20 (FIG. 1) only while the tube receives the deflection voltages for tracing strokes 1–8, 11 and 12. During strokes 9 and 10, the electron beam is turned off so that the corresponding segments of the letter will not appear more intense than others.

Figure 3B:
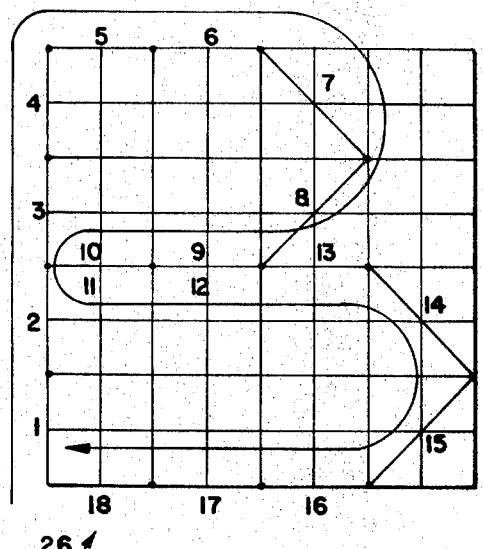
FIG. 3B shows the stroke pattern for another such character.

FIG. 3B shows the formation of the stroke pattern for the letter B. It consists of a string of eighteen strokes identified as follows:

| | |
|---|---|
| 1-$d$ | 10-$g$ |
| 2-$d$ | 11-$a$ |
| 3-$d$ | 12-$a$ |
| 4-$d$ | 13-$a$ |
| 5-$a$ | 14-$m$ |
| 6-$a$ | 15-$h$ |
| 7-$m$ | 16-$g$ |
| 8-$h$ | 17-$g$ |
| 9-$g$ | 18-$g$ |

Figure 11:
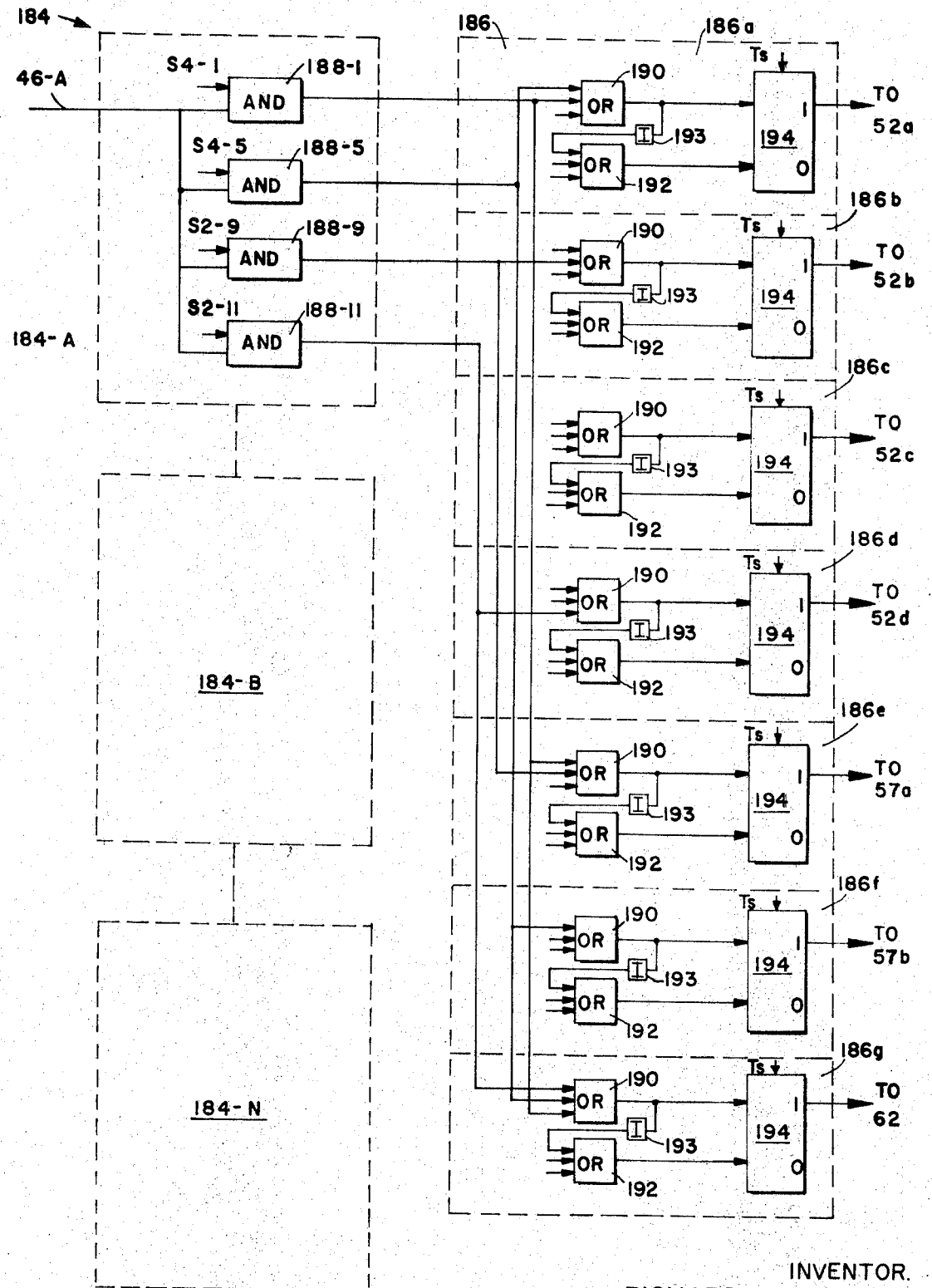
FIG. 11 is a further matrix embodiment used in the FIG. 1 system.

Table I below shows typical stroke patterns and corresponding sets of unblanking signals for several other characters in common usage. The strokes in the numbered sequence for each character are identified by the letters $a$–$k$ and $m$ used in FIG. 2. The underlined strokes are those coinciding with unblanking signals that render them visible on screen 20$a$ (FIG. 11).

TABLE I

| | Strokes | | | | | | | | | | | | | | | | | | | | |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 |
| C | $b$ | $b$ | $b$ | $a$ | $f$ | $\underline{g}$ | $\underline{g}$ | $h$ | $j$ | $j$ | $m$ | $\underline{a}$ | $\underline{a}$ | $b$ | | | | | | | |
| D | $\underline{d}$ | $\underline{d}$ | $\underline{d}$ | $\underline{d}$ | $\underline{a}$ | $\underline{a}$ | $\underline{a}$ | $m$ | $\underline{j}$ | $\underline{j}$ | $h$ | $\underline{g}$ | $\underline{g}$ | $\underline{q}$ | | | | | | | |
| F | $\underline{d}$ | $\underline{d}$ | $\underline{d}$ | $\underline{d}$ | $\underline{a}$ | $\underline{a}$ | $\underline{a}$ | $a$ | $i$ | $i$ | $\underline{g}$ | $\underline{g}$ | $\underline{g}$ | | | | | | | | |
| M | $\underline{d}$ | $\underline{d}$ | $\underline{d}$ | $\underline{d}$ | $\underline{m}$ | $\underline{m}$ | $b$ | $\underline{b}$ | $j$ | $j$ | $\underline{j}$ | $\underline{j}$ | | | | | | | | | |
| P | $\underline{d}$ | $\underline{d}$ | $\underline{d}$ | $\underline{d}$ | $\underline{a}$ | $\underline{a}$ | $a$ | $m$ | $h$ | $\underline{g}$ | $\underline{g}$ | $\underline{g}$ | | | | | | | | | |
| 2 | $\underline{d}$ | $\underline{d}$ | $\underline{d}$ | $\underline{b}$ | $\underline{a}$ | $\underline{a}$ | $m$ | $h$ | $\underline{g}$ | $\underline{g}$ | $h$ | $\underline{j}$ | $\underline{a}$ | $\underline{a}$ | $\underline{a}$ | $\underline{a}$ | | | | | |
| 8 | $c$ | $c$ | $\underline{a}$ | $\underline{a}$ | $\underline{m}$ | $\underline{h}$ | $\underline{g}$ | $\underline{g}$ | $f$ | $\underline{b}$ | $\underline{f}$ | $\underline{b}$ | $\underline{a}$ | $\underline{a}$ | $\underline{m}$ | $\underline{n}$ | | | | | |

Referring again to FIG. 1, the apparatus for generating the aforesaid stroke patterns and unblanking signals comprises a memory 32 or other comparable instruction providing means. Each instruction includes character-identifying signals which correspond to a given character in the frame to be displayed.

In response to a request therefor, memory 32 applies the character-identifying instructions to a buffer register 34 in the order in which the characters are to be displayed. At the same time, a positioning circuit 36 sequentially provides deflection signals corresponding to the vertical and horizontal coordinates of the respective characters on screen 20$a$, i.e. the locations of the symbol spaces 26 on the screen. These deflection signals are coupled by way of a pair of vertical and horizontal summing amplifiers 40 and 42 respectively to deflector 22. The manner in which the deflection signals are derived is not part of the present invention. They may be produced automatically to index the electron beam to the next symbol space after each character has been traced; they may be developed from position signals stored in memory 32, or as in the usual case, a combination of these may be used.

Each character-identifying instruction stored in register 34 is applied to a decoder 46 which then identifies the particular character in question. In the illustrated embodiment, each output terminal on decoder 46 corresponds to a different character in the set capable of being displayed by the system.

A gate matrix 48 is connected to the decoder 46 output terminals. Matrix 48 has output terminals 49$a$–49$f$ corresponding to the four horizontal vector components $x$, $-x$, $2x$, $-2x$ and two vertical vector components $2y$, $-2y$ used to form the various strokes $a$ to $k$ and $m$ shown in FIG. 2. An additional output terminal 49$g$ controls stroke intensity. Upon receiving timing signals from a clock and distributor 50, matrix 48 develops a succession of timed signals and applies selected ones of these signals to each of its respective output terminals 49$a$–49$g$.

The pulse trains at terminals 49$a$–49$d$ are applied to four input terminals 51$a$–51$d$, respectively, of a digitally-controlled horizontal ramp generator 52. The output of generator 52 is a single succession of voltage ramps whose slopes depend upon which input terminal 51$a$–51$d$, if any, is being energized at that particular time. These slopes correspond to the horizontal components of successive strokes in the pattern. The ramp voltages are added in the summing amplifier 42 to the horizontal gross beam positioning signals from positioning circuit 36 and then are applied to deflector 22. They suffice to move the electron beam in tube 20 horizontally one way or the other within symbol space 26 to trace in sequence all the horizontal components of strokes in the pattern for the character of interest (assuming no vertical deflection and that the beam is turned on.)

Similarly, the timed signals at terminals 49$e$ and 49$f$ representing the two possible vertical stroke components are fed to a pair of input terminals 56$a$ and 56$b$ of a ramp generator 57 which then also generates a succession of ramp voltages. The slope of the output voltage of generator 57 at any given time depends on whether one of terminals 56$a$ and 56$b$ is energized at that time and, if so which terminal is energized. The output of generator 57 is summed in summing amplifier 40 with the vertical gross beam positioning voltage from circuit 36 and then applied to deflector 22. It moves the electron beam in tube 20 vertically within symbol space 26.

When the positioning signals from circuit 36 and the deflection signals from ramp generators 52 and 57 are applied simultaneously to deflector 22 (assuming no blanking), the electron beam traces in symbol space 26 the entire sequence of strokes in the pattern for the character contained in register 34, e.g. the stroke pattern for the letter "A" illustrated in FIG. 3A. We are using the word "trace" here to mean that the system generates the deflection signals that would cause the electron beam to draw the pattern on screen 20$a$ if the beam were turned on.

Still referring to FIG. 1, as noted above, some of the strokes of the pattern for the character in question are actually retraces of previous strokes. For example, in FIG. 3A, the strokes 9 and 10 are retraces of strokes 7 and 8, respectively. To avoid displaying these strokes twice, tube 20 is blanked either during the tracing of the stroke originally or during the retrace thereof. More particularly, signals at terminal 49g which are indicative of those strokes in the associated character pattern which have to be visibly traced on screen 20a to form that character are applied by way of an unblanking amplifier 62 to the intensity control of tube 20. These signals turn on the electron beam in tube 20 only at the precise times to visibly trace those strokes actually displayed in tracing the selected character, e.g. stroke 1–8, 11 and 12 in FIG. 3A.

Figure 4:
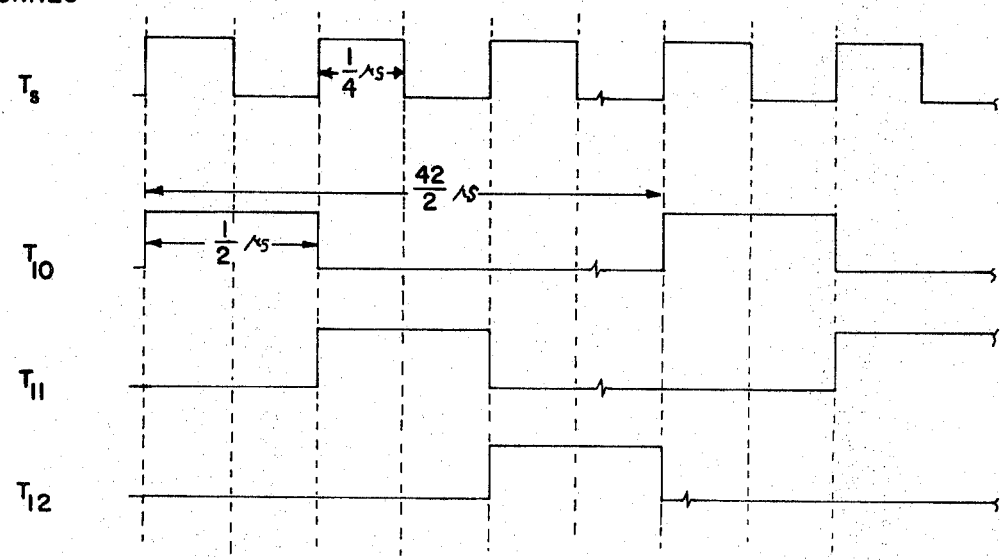
FIG. 4 shows the timing signals developed by the clock and distributor in FIG. 1.

Referring now to FIGS. 1 and 4, in a preferred embodiment of the invention, clock and distributor 50 generates a basic clock signal $T_s$ having a period of 0.5 microsecond and a duration of one-quarter microsecond. Also, clock 50 develops a set of successive 0.5 microsecond timing signals $T_0$, $T_1$, $T_2$, $T_3$ . . . $T_{41}$. Preferably, the number of these timing signals exceeds the number of strokes in the pattern for the most complicated character to be displayed. Also, the negative transition of a $T_s$ signal occurs near the middle of each timing signal.

Signal $T_s$ is used to synchronize switching in the system as will be described later. Signals $T_{10}$ and $T_{34}$, on the other hand, define the stroke intervals. That is, each stroke in a stroke pattern is traced in 0.5 microsecond, and the entire pattern is traced in 0.5 to 12 microseconds, depending upon its complexity. The time between signals $T_1$ to $T_{10}$ is not wasted. Rather it is used for beam positioning and other system operations which are not part of this invention.

Figure 5:
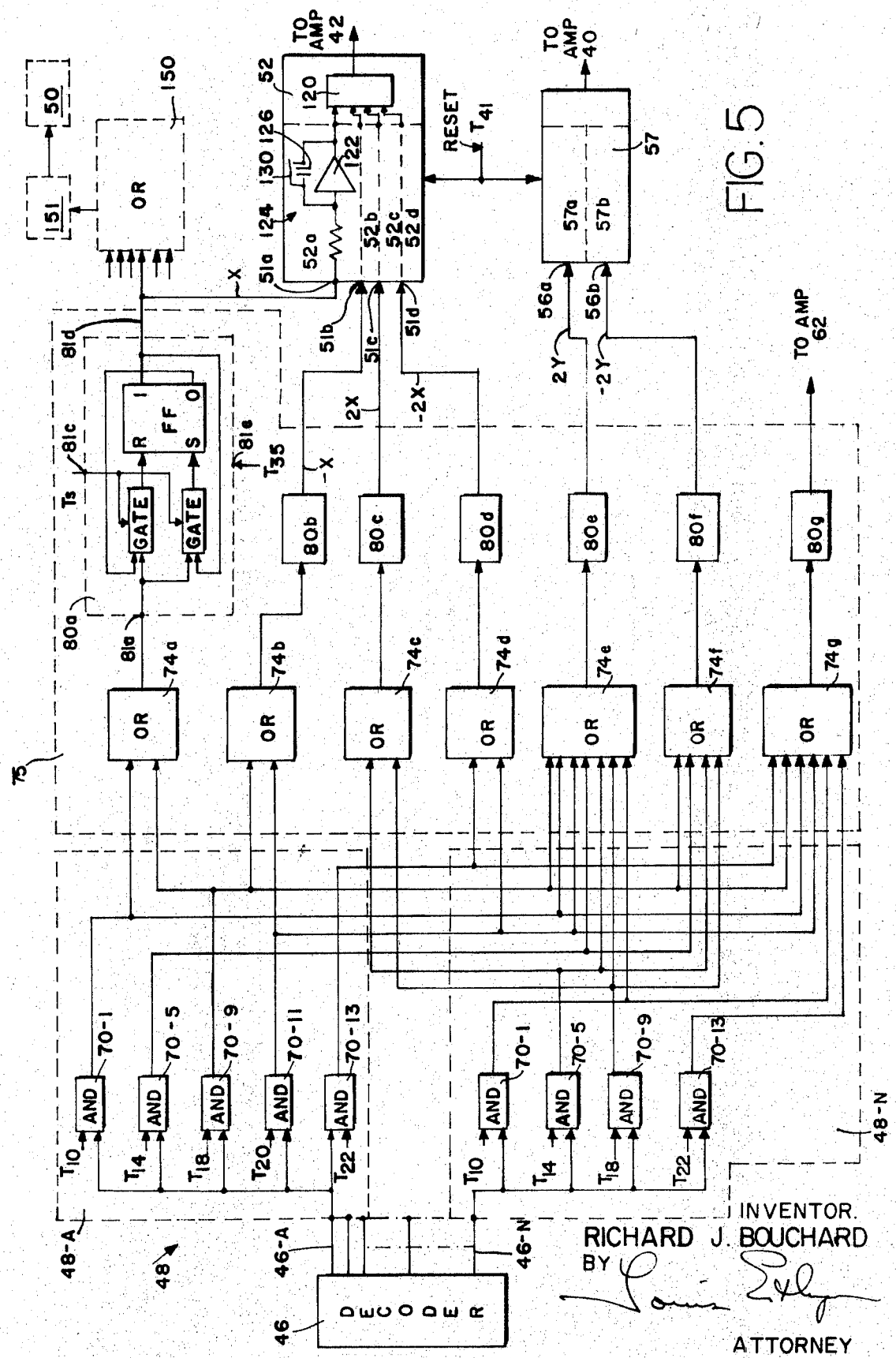
FIG. 5 is a block diagram partly in schematic form showing in greater detail the matrix in FIG. 1.

Referring now to FIGS. 1 and 5, the preferred matrix 48 design in a given situation will depend on the particular character set to be displayed and also on the number of data lines desired between various components of the particular system. It will also depend on whether minimum circuit complexity or ability to expand or change character set is more important. We will deal specifically with some of the more useful matrix designs.

For purposes of illustration, assume that the system is to display characters from a set consisting of one hundred characters, the most complicated of which requires twenty-five strokes. Therefore, decoder 46 has one hundred output terminals, one for each character in the set. These terminals are labeled 46–A, 46–B, 46–C, etc., with the letters indicating the particular characters associated with the respective terminals. Assume that the instruction for each character is loaded into register 34 during a $T_0$ timing pulse from clock 50.

Still referring to FIG. 5, matrix 48 comprises one-hundred sections, 48–A, 48–B, 48–C, etc., one for each decoder 46 output terminal. Since all the sections have similar logic designs, we will describe in detail the operation of section 48–A only, a preferred embodiment of which is shown in FIG. 5. This section controls the generation of the stroke pattern for "A."

Matrix section 48–A comprises a layer 70 of AND gates, each connected to receive the output from terminal 46–A. The number of AND gates in layer 70 depends upon the number of changes in stroke direction which occur when tracing the strokes which are actually required to display "A." It also depends on the number of times the beam must be turned on and off (i.e. changes in blanking condition). Each gate 70 is associated with one stroke in the twenty-five stroke sequence and they are labeled 70–1, 70–2 . . . 70–25 in correspondence with the stroke number they are associated with. In other words, if a particular character requires a change in stroke direction or blanking condition at stroke 1, the corresponding decoder 46 terminal is connected to AND gate 70–1 in the corresponding matrix section 48. If the character requires such change at stroke 2, the corresponding decoder terminal is connected to AND gate 70–2 in that section.

The same procedure is followed with respect to the remaining matrix 48 sections corresponding to other characters in the set.

For example, FIG. 3A shows that during the display of the letter "A," there are a total of five such changes or transitions. More particularly, the first stroke in the "A" pattern is a $c$ stroke which must be visibly traced on the screen to form the letter "A." Therefore, the first such change occurs at stroke 1. Consequently, decoder terminal 46–A is connected to AND gate 70–1 in matrix section 48–1. The following three strokes are also $c$ strokes which must be visibly traced to display "A."

The next change occurs at the beginning of stroke 5 at the top of the second leg of the letter "A." Stroke 5, as well as the following strokes 6–8, are $k$ strokes whose slopes are different from those of the $c$ strokes. However, there is no change in blanking conditions here since strokes 5–8 must also be visibly traced to form the letter "A." Therefore, decoder terminal 46–A is connected to AND gate 70–5 in matrix section 40–A.

Strokes 9 and 10 of the FIG. 3A pattern are $e$ strokes and, furthermore, they are retraces of strokes 7 and 8 and should not be visibly traced. Consequently, stroke 9 involves a change in both stroke slope and blanking condition so that decoder terminal 46–A is connected to AND gate 70–9. Similarly, there is a change in both stroke slope and blanking condition at the beginning of stroke 11 to form the $g$ strokes 11 and 12 which complete the "A" trace. Finally, at the beginning of stroke 13, there must be a change in blanking condition so that the electron beam is turned off after the letter "A" is complete. Therefore, output terminal 46–A is connected to AND gate 70–13 in matrix section 48–A.

Still referring to FIG. 5, the layer 70 AND gates are enabled by the appropriate timing signals $T_{10}$ to $T_{41}$ at those times corresponding to the commencement of the strokes with which the gates are associated, i.e. when the aforesaid changes occur. More particularly, in the case of the letter "A," the $T_{10}$ timing signal occurring at the beginning of stroke 1 is applied to gate 70–1, the $T_{14}$ signal corresponding to stroke 5 is applied to gate 70–5, the $T_{18}$ signal is fed to gate 70–9, the $T_{20}$ is applied to gate 70–11 and the $T_{22}$ signal is applied to gate 70–13.

Each enabled AND gate 70 produces an output signal. Thus, the output from matrix 48–A is a single succession of control signals which are emitted in turn from gate 70–1, 70–5, 70–9, 70–11, and 70–13. Each signal represents a change in stroke direction or stroke blanking condition or both of these factors which is required to display "A." These signals are applied to one of seven OR circuits 74a–74g in a section 75 of matrix 48. These seven OR circuits correspond respectively to the four inputs to ramp generator 52, the two input to ramp generator 57 and the input to the unblanking amplifier 62 (FIG. 1).

The layer 70 gates associated with a change in stroke direction calling for a change in the horizontal stroke component $+x$ are connected to OR circuit 74a; those gates associated with a direction change requiring a transition in the horizontal component $-x$ are connected to OR circuit 74b, and so on. It should be understood that the change may be due to the fact that a particular stroke calls for a vector component not required by the immediately preceding stroke. Alternatively, the change may result because the previous stroke required a vector component which is not needed by the new stroke.

Similarly, those gates associated with changes in the blanking condition of the beam are connected to OR circuit 74g.

Thus, in the case of "A," to effect the necessary changes in the horizontal components, gates 70–1 and 70–9 are coupled to OR circuit 74a; gates 70–9 and 70–11 are coupled to circuit 74b; no gates are connected to circuit 74c since the "A" pattern requires no +2x stroke components. Finally, gate 70–11 is connected to OR circuit 74d. Also to produce the requisite changes in the vertical stroke components, gates 70–1, 70–5, 70–9 and 70–11 are connected to OR circuit 74e; gates 70–5 and 70–9 are connected to circuit 74f. Finally, to appropriately control the electron beam so that only necessary strokes in the "A" pattern are actually displayed, gates 70–1, 70–9, 70–11 and 70–13 are connected to OR circuit 74g.

When the system is to display "A," the decoder output terminal 46–A is energized from time $T_0$ when the instruction for that character is first loaded into register 34 (FIG. 1), to time $T_{41}$, the end of a complete cycle of clock 50. The output signal at terminal 46–A thus has the waveform illustrated by the curve 77 in FIG. 6. That figure also shows the $T_s$ timing pulses. As seen from FIG. 6, the output of OR circuit 74a, illustrated by curve 78, is composed of two pulses, one occurring at the beginning of $T_{10}$, corresponding to the beginning of stroke 1, and the other occurring at the start of $T_{18}$, corresponding to the beginning of stroke 9.

Referring again to FIG. 5, the outputs of OR circuits 74a–74g are applied to bistable circuits 80–80g are applied to bistable circuits 80a–80g respectively, in matrix section 75. Each circuit 80a–80g contains a conventional bistable flip-flop with gated inputs. Its operation is such that the coincidence of (1) a positive signal applied to its input terminal 81a by an OR circuit 74 and (2) the negative transition of a $T_s$ pulse applied to a terminal 81c by the clock and distributor 50 (FIG. 1) complements the flip-flop, i.e. changes its state.

Figure 6:
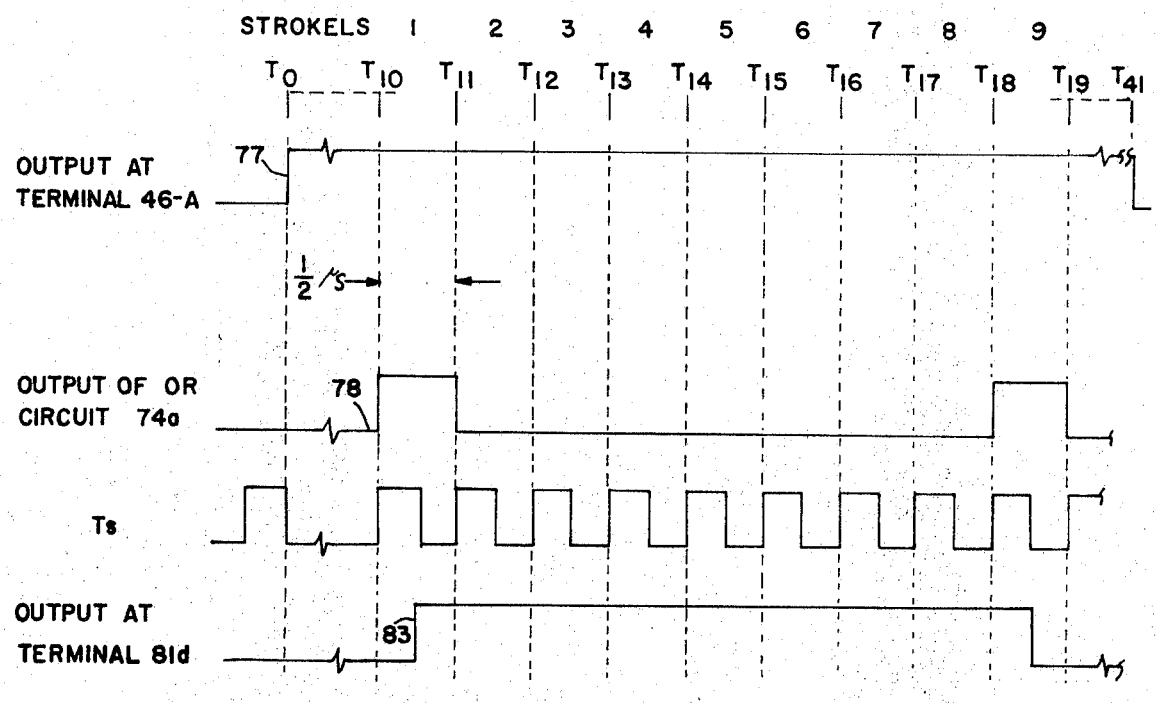
FIG. 6 shows graphs of several voltages plotted as a function of time, illustrating the operation of the matrix in FIG. 1.

As seen from FIGS. 4 and 6, the negative transition of the $T_s$ pulse is delayed with respect to the beginning of the stroke interval to assure that the signals gated out of matrix sections 48–A are applied to corresponding circuit 80a–80d prior to the negative transition of the $T_s$ pulse.

Thus, in the present example of the letter "A," curve 78 in FIG. 6 shows that a pulse from OR circuit 74a is applied to terminal 81a of bistable circuit 80a during the $T_{10}$ pulse. Accordingly, circuit 80a switches to the ONE state upon the occurrence of the negative transition of the $T_s$ signal during the $T_{10}$ pulse and an output signal appears at its output terminal 81d. The signal at terminal 81d has the waveform 83 shown in FIG. 6 and constitutes the input at terminal 51a of ramp generator 52. The signal at terminal 81b persists until the arrival of the next pulse from OR circuit 74a at the beginning of $T_{18}$. Then at the first negative transition of the $T_s$ signal thereafter, circuit 80 switches to the ZERO state and, as seen from curve 83 (FIG. 6), the signal at terminal 81d drops to zero.

At the end of the display period, a $T_{41}$ timing signal is applied to a terminal 81e of each circuit 80a–80g to remove any signal that might possibly remain on output terminal 81d after the entire stroke pattern has been completed.

Figure 7:
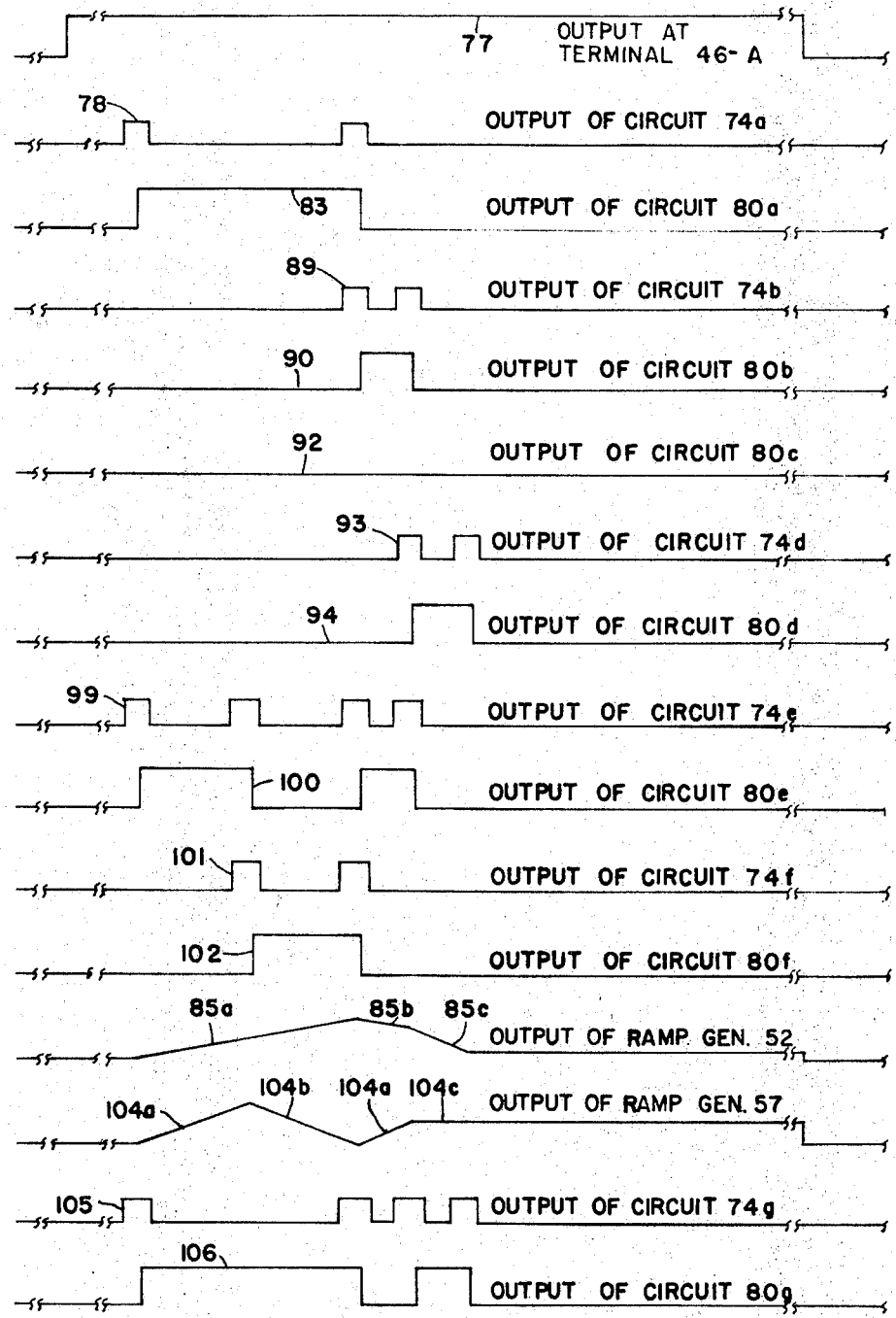
FIG. 7 shows graphs of several voltages plotted as a function of time illustrating the overall operation of the FIG. 1 system.

Still referring to FIG. 5, when the output signal from bistable circuit 80a is applied to input terminal 51a of ramp generator 52, the latter generates a stroke signal during the period from the middle of $T_{10}$ to the middle of $T_{18}$, with the one-unit slope 85a shown in FIG. 7. This slope corresponds to the horizontal components of the c and k strokes 1–8 in the pattern for the letter "A" shown in FIG. 3A.

The remaining bistable circuits 80b–80g in matrix section 75 operate in exactly the same way. Each receives timed pulses from the corresponding OR circuit 74b–74g and switches back and forth between the ONE and ZERO states with successive pulses. Accordingly, each circuit 80b–80g develops a train of D.C. signals whose time duration depends upon the spacing between the successive pulses applied thereto. The signals from circuits 80b–80g are applied to the input terminals 51b–51d, respectively, of ramp generator 52, while those from circuits 80e and 80f are coupled to terminals 56a and 56b of ramp generator 57. The signal from circuit 80g controlling unblanking is applied to unblank amplifier 62.

FIG. 7 also shows the waveforms of other pertinent signals in the system as it displays the letter "A". The strokes having a horizontal component of $-x$ are the contiguous e strokes 9 and 10 (FIG. 3A). Therefore, the output signal from OR circuit 74b associated with that component is composed of a pulse during $T_{18}$ and a second pulse during $T_{20}$ as seen from curve 89 in FIG. 7. These are applied to bistable circuit 80b whose output is shown by curve 90 in FIG. 7. It remains zero, except during a period from the middle of $T_{18}$ to the middle of $T_{20}$ when it becomes positive. During this time, generator 52 generates a stroke signal having a one-unit negative slope 85b.

FIGS. 2 and 3A show that the "A" pattern has no strokes with a horizontal component of $+2x$. Therefore, no signals are applied to OR circuit 74c associated with input terminal 51c of integrator 52 and the output voltage of bistable circuit 80c remains zero during the entire interval $T_{10}$ to $T_{41}$, as illustrated at 92 in FIG. 7.

The "A" pattern also has two contiguous g strokes 11 and 12 which have slopes with a horizontal component of $-2x$. Therefore, the OR circuit 74d associated with that component emits a pulse during $T_{20}$ and another during $T_{22}$ as seen by curve 93 in FIG. 7. Consequently, the output of circuit 80d is zero except during the period from the middle of $T_{20}$ to the middle of $T_{22}$, as indicated by the waveform 94 shown in FIG. 7. During this interval, ramp generator 52 develops a stroke signal having a two-unit negative slope 85c (FIG. 7) corresponding to the horizontal components of strokes 11 and 12.

Thus, FIG. 7 shows the waveform of the output signal from ramp generator 52 during the entire period of clock and distributor 50. It is made up of a succession of voltage ramps whose slopes depend upon which generator 52 input terminal is energized at a given time. These slopes change in correspondence with the horizontal components of the successive strokes in the "A" pattern.

Referring to FIGS. 1 and 5, matrix 48 controls vertical deflection in much the same way except that is provides only two possible output signals. This is because, as noted above in connection with FIG. 2, the slopes of the various strokes used in the present system call for two-increment vertical deflection only. Matrix 48 applies signals corresponding to a vertical stroke component of $+2y$ to the input terminal 56a of ramp generator 57, and $-2y$ component signals to its terminal 56b.

Thus, in the example of the letter "A," FIGS. 2 and 3A show that c strokes 1 to 4 and e strokes 9 and 10 have a vertical component of $+2y$. Therefore, OR circuits 74e emits four pulses during $T_{10}$, $T_{14}$, $T_{18}$ and $T_{20}$, respectively, as shown by curve 99 in FIG. 7. Circuit 80e, in turn, develops an output signal illustrated by curve 100 in FIG. 7. On the other hand, k strokes 5–8 have a vertical component of $-2y$. Consequently, OR circuit 74f emits pulses during $T_{14}$ and $T_{18}$ as illustrated at 101 in FIG. 7. Thereupon, circuit 80f develops a signal train illustrated by the curve 102 in FIG. 7.

These output signals are applied to the input terminals 56a and 56b, respectively, of generator 57 which then develops a succession of stroke signals whose slopes depend upon which input terminal is energized. FIG. 7 shows the waveform of this output signal. During strokes 1–4, 9–10, it has a two-unit positive slope 104a; during strokes 5–8, it has a two-unit negative slope 104b and during strokes 11 and 12, it has zero slope 104c.

The vertical and horizontal deflection voltages developed by ramp generators 52 and 57 are coupled to deflector 22 (FIG. 1). The deflector then generates fields capable of moving the electron beam in tube 20 so that, if it was turned on, it would visibly trace in succession all the strokes 1–12 of the FIG. 3A pattern.

As noted above in connection with FIG. 1, however, certain of the strokes (e.g. strokes 9 and 10 of the "A" pattern) should not be visibly displayed on screen 20a. Accordingly, matrix 48 also develops a set of unblanking signals corresponding to the character to be displayed. These are applied to the intensity control of tube 20 so that only the necessary strokes in the pattern are visibly displayed.

Thus, for "A," FIG. 3A shows that strokes 1–8, 11 and 12 must be visibly traced to display this character. Therefore, OR circuit 74g emits pulses during $T_{10}$, $T_{18}$, $T_{20}$ and $T_{22}$ as illustrated at 105 in FIG. 7. Thereupon, circuit 80g develops a succession of signals shown at 106 in FIG. 7 which are precisely timed to turn on the electron beam in tube 20 (FIG. 1) only when the vertical and horizontal deflection voltages are present for those named strokes which must be visible on tube screen 20a.

In summary, as the instruction for each character in the frame is loaded into register 34 (FIG. 1), the system develops successive vertical and horizontal deflection voltages capable of moving the electron beam to trace all of the strokes in the pattern for that particular character if the beam were turned on. In addition, it generates a distinctive set of unblanking signals for that character to turn on the electron beam at the proper times to display those strokes which are necessary to visibly trace the character.

It should be mentioned at this point that there may be several ways to trace out a given character pattern. The sequence requiring the least number of strokes is often preferable. Other criteria include the desirability of minimizing circuit complexity and making unblanking as continuous as possible. Also, with a given character, there may be a choice as to which strokes are to be visibly displayed. For example, to display "A," tube 20 could be turned off during strokes 7 and 8 of the "A" pattern and turned on during strokes 9 and 10 thereof.

As shown in FIG. 5, ramp generator 52 may comprise four separate conventional integrators 52a–52d. These circuits receive the signal trains from bistable circuits 80a–80d, respectively, and generate ramp voltages whose slopes correspond to the four possible horizontal stroke components $+x$, $-x$, $+2x$ and $-2x$, respectively. The separate ramp voltages from integrators 52a–52d are fed to a conventional summing network 120 and applied as a single sequence of voltages to summing amplifier 42 (FIG. 1). Since the four integrators are much the same, for illustrative purposes we will describe only integrator 52a in detail.

Integrator 52a comprises a conventional operational amplifier 122 and feedback capacitor 126. The one-unit slope 85a (FIG. 7) of the voltage ramp which it generates may be controlled by proper selection of the value of capacitor 126. A switch 130 connected across capacitor 126 is closed by a $T_{41}$ timing signal to discharge the capacitor after the completion of each character to remove the output voltage from integrator 52a. This is done to return the electron beam to its point of origin e.g. the lower left corner of "space" 26 (FIG. 1) so it will be ready for the next position instruction.

Integrator 52c in ramp generator 52 is the same as integrator 52a, except that its capacitor 126 value provides a two-unit ramp slope. Integrators 52b and 52d are somewhat different from integrators 52a and 52c in that they generate voltage ramps whose slopes are negative. Their feedback capacitance values are selected to provide the requisite one-unit and two-unit slope magnitudes, respectively.

For ease of illustration we have pictured ramp generator 52 as comprising four separate integrators. In actual practice, however, ramp generator 52 preferably comprises a single capacitor charged from a constant current source. The magnitude and direction of the charging current is controllable by digital input signals from bistable circuits 80a–80d.

Ramp generator 57 has two integrators 57a and 57b identical with integrators 52b and 52c, respectively. Integrator 57a receives signals on terminal 56a and generates voltage ramps whose slope 104a (FIG. 7) corresponds to the vertical component $+2y$. Circuit 57b receives signals on terminal 56b and generates voltage ramps whose slope 104b (FIG. 7) corresponds to the component $-2y$. The separate output voltages from circuits 57a and 57b are summed and applied as a string of voltages to amplifier 40. The capacitors 126 in all the integrators 52b–52d, 57a and 57b are discharged by the $T_{41}$ signal to reset the electron beam as noted above in connection with integrator 52a.

If desired, the system can be made to commence the display of each character in the frame as soon as the previous character is completed. At the top of FIG. 5, we have indicated by dotted lines the components for doing this. All the output signals from bistable circuits 80a–80f are coupled by way of an OR circuit 150 to an inverter 151. When a signal is present from any of these circuits, there is no output signal from inverter 151. This situation occurs as long as the electron beam in tube 20 (FIG. 1) is in the process of being moved to display a character. However, as soon as the beam has reached its ultimate destination and the character is complete, the ouput signals from all these circuits drop to zero. When this occurs, inverter 151 emits a pulse which is applied to clock 50 to reset the clock so that the next timing signal generated thereby is a $T_{41}$ signal. The $T_{41}$ signal, in turn, readies the system to display the next character as described above.

There are, of course, other ways of accomplishing the same thing. For example, the instruction for each character may include data relating to the number of strokes in the associated pattern. This data may then be processed to develop a signal like that from inverter 151 to reset clock 50 at the proper time.

Still referring to FIG. 5, the remaining matrix sections 48–B, 48–C, etc., in matrix 48 are much the same as section 48–A. Each section is connected to the corresponding decoder 46 output terminal and comprises a layer 70 of AND gates. These gates are enabled in sucession by selected timing signals from clock and distributor 50 which correspond to the voltage transitions required at the inputs to ramp generators 52 and 57 and amplifier 62 to display the character in question. As with the matrix section 48–A, the outputs of each matrix section 48–B, 48–C, etc., are applied to the appropriate OR circuits 74a–74g in matrix section 75 to effect these transitions.

As seen from FIG. 5, the display of an "A" requires only five AND gates 70. This is in sharp contrast to the fifteen gates or fifteen-tap delay line needed by conventional display systems which do not take advantage of simultaneous changes in the vector components and blanking conditions of the various strokes comprising the character.

As a further example, in FIG. 5 we have shown a matrix section 48–N and its connections to the OR circuits in matrix section 75 to enable the system to display the letter "N".

It is important to note that, except for its sections 48–A, 48–B, etc., the makeup of matrix 48 is the same for all characters displayed by the system. Therefore, if matrix sections 48–A, 48–B, etc., are mounted on individual card-like plug-in modules, changing the character set for display by the system is simply a matter of changing these modules. Moreover, adaptation of the system to handle larger or more complex character sets just involves adding more matrix sections corresponding to the new characters and, if necessary, enlarging the clock 50 cycle.

Figure 8:
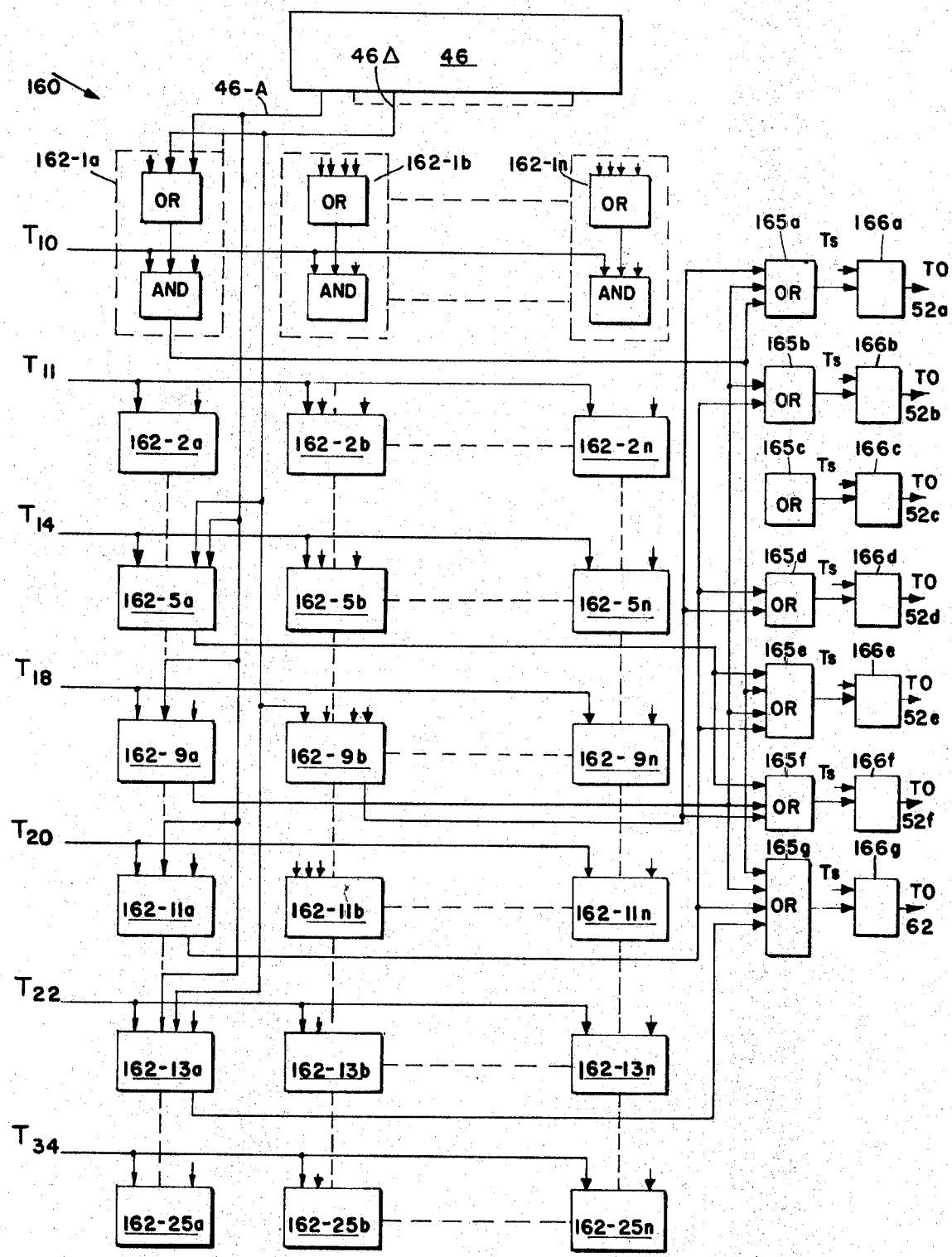
FIG. 8 is a block diagram of another matrix embodiment used in the FIG. 1 system.

FIG. 8 illustrates another preferred matrix embodiment 160 which takes advantage of the fact that many characters in a set may require the same combination of stroke components and unblanking during the same stroke interval, i.e. during the same timing signal from clock and distributor 50 (FIG. 1). This results in a further reduction in the logic components required to display a given set of characters, as will be shown presently.

Matrix 160 comprises columns and rows of identical logic circuits 162. Each circuit 162 includes an OR circuit and an AND gate pair. For ease of illustration, we have shown these components only in the top row of circuits 162. The number of horizontal rows of circuits 162 corresponds to the stroke capacity of the system, i.e. twenty-five in the present system. Accordingly, reading from the top row to the bottom row, the circuits are numbered 162–1, 162–2, . . . 162–25, corresponding to the respective strokes.

The number of vertical columns in matrix 160 depends upon the different combinations of changes in stroke direction and blanking condition required to trace the various characters in the set to be displayed. We have identified the circuits in each column by the letters $a, b, c \ldots n$ following the row identifying number. Thus, for example, the circuit 162 in the top row, left-hand column, is identified as 162–1$a$. The adjacent circuit in row 1, column 2, is identified as 162–1$b$ and so on. Thus, the circuit 162 in row 25, second column, is identified as circuit 162–25$b$.

The output terminals of decoder 46 associated with those characters calling for the same combination of stroke components and unblanking during the stroke 1 interval in the sequence are connected to circuit 162–1$a$. Similarly, the decoder terminals associated with those characters requiring a different combination of stroke components and unblanking during stroke 1 are connected to circuit 162–1$b$. In this fashion, all the different combinations of stroke components and unblanking during stroke 1 are handled by the respective circuits 162–1$a$ to 162–1$n$.

Similarly, the decoder terminals associated with characters requiring a particular combination of stroke components and unblanking at stroke 2 are connected to circuit 162–2$a$. The terminals for other characters needing a different such combination during stroke 2 as connected to circuit 162–2$b$ and so on. This procedure is followed for the rest of the rows of circuits 162 corresponding to the successive strokes in the stroke sequence. Thus, the decoder 46 terminals associated with characters calling for a particular combination of stroke components and unblanking during stoke 25 are connected to circuit 162–25$a$. In this way, matrix 160 accommodates all the combinations of stroke components and blanking condition required by the characters in the set during the twenty-five strokes in the sequence.

The output signal from each circuit 162 is used to control those integrators in ramp generators 52 and 57 and the unblanking amplifier 62 which produce the combination of stroke components and blanking condition associated with each circuit 162. As such, the connections are similar to those shown in the FIG. 5 system. However, there are not as many.

More particularly, the control signals from circuits 162 for integrator 52$a$ are coupled by way of an OR circuit 165$a$ to a bistable circuit 166$a$. Similarly, the control signals for integrators 52$b$–52$d$ are applied by way of OR circuits 165$b$–165$d$ to bistable circuits 166$b$–166$d$, respectively.

In like manner, the control signals for integrators 57$a$ and 57$b$ are coupled by way of OR circuits 165$e$ and 165$f$, respectively, to bistable circuits 166$e$ and 166$f$, respectively. Finally, the unblanking control signals are applied by way of an OR circuit 165$g$ and a bistable circuit 166$g$ to amplifier 62. All the circuits 166 are like the bistable circuit 80 shown in FIG. 5.

The timing signals $T_{10}$ to $T_{41}$ from clock 50 (FIG. 1) successively enable each row of circuits 162 in matrix 160 to develop the requisite stroke signals to cause the proper combinations of transitions at the ram generators 52 and 57 and amplifier 62 during each stroke interval.

In FIG. 8, we have shown specifically the connections required to display the characters "A" and "Δ". As noted previously, there are five different sets of transitions in stroke slope and unblanking when displaying an "A." These occur at the beginning of strokes 1, 5, 9, 11 and 13. "Δ", on the other hand, has four different sets of transitions occuring at the beginning of strokes 1, 5, 9 and 13, respectively. Therefore, normally, the display of these two characters would require a total of nine gates to gate out pulses at the appropriate times to cause these transitions.

The FIG. 8 system also requires five circuits 162 to display "A." That is, decoder terminal 46–A must be connected to circuits 162–1$a$, 162–5$a$, 162–9$a$ and 162–13$a$. However, this system needs only one more gate 162 to display "Δ" as well. This is because the first two transitions of the set for "Δ" are the same and occur at the same time as the first two transitions of the set for "A." Therefore, terminal 46–Δ may also be connected to circuits 162–1$a$ and 162–5$a$. In addition, terminal 46–Δ is connected to circuit 162–9$b$ to produce the different combination of transitions required for that character at stroke 9 in ramp generators 52 and 57 and unblanking amplifier 62.

Finally, "Δ" requires the same transition as "A" at stroke 13 (corresponding to the $T_{22}$ signal). Therefore, terminal 46–Δ is also connected to circuit 162–13$a$. Thus, the FIG. 8 apparatus minimizes the logic required in such display systems, which is reflected in a reduced size and cost of the installation as a whole.

In some applications it may be preferred that decoder 46 be the type which detects characters requiring the same stroke direction and blanking condition during selected stroke intervals. In this event it would emit enabling signals on the same output line directly to the AND gates in circuits 162. In this event, the OR circuits in these circuits 162 may be eliminated.

It should be understood at this point that other matrix designs are possible utilizing combinations of the matrices shown in FIGS. 5 and 8. Further, the disclosed system may be used in conjunction with a conventional system which generates a fixed pattern of strokes. The more complex characters can utilize the variable stroke pattern, while the simpler characters can be generated using fixed stroke patterns, each of which corresponds to a particular character.

The timing signals from clock and distributor 50 discussed above all have the same duration or pulse width. However, in a given character set, there may be many instances where a given stroke direction is maintained for 2, 3 or 4 stroke intervals. Thus, rather than produce timing signals which define single stroke intervals, it may be preferable to use signals defining 2, 3 or 4 or more intervals. This often results in a reduction in the number of logic components required in the system, depending on the character set to be generated.

More particularly, as seen from FIGS. 3A and 3B, when using the present 4×4 stroke grid, there are many places where a given stroke direction is maintained for two or four stroke intervals, e.g. strokes 9–10 and 1–4, respectively, in FIG. 3A.

If a shift counter is used to provide stroke countdown, these different duration stroke timing signals may be gated out using only a few more logic elements than are required to generate the twenty-four one-stroke interval signals.

Figure 9:
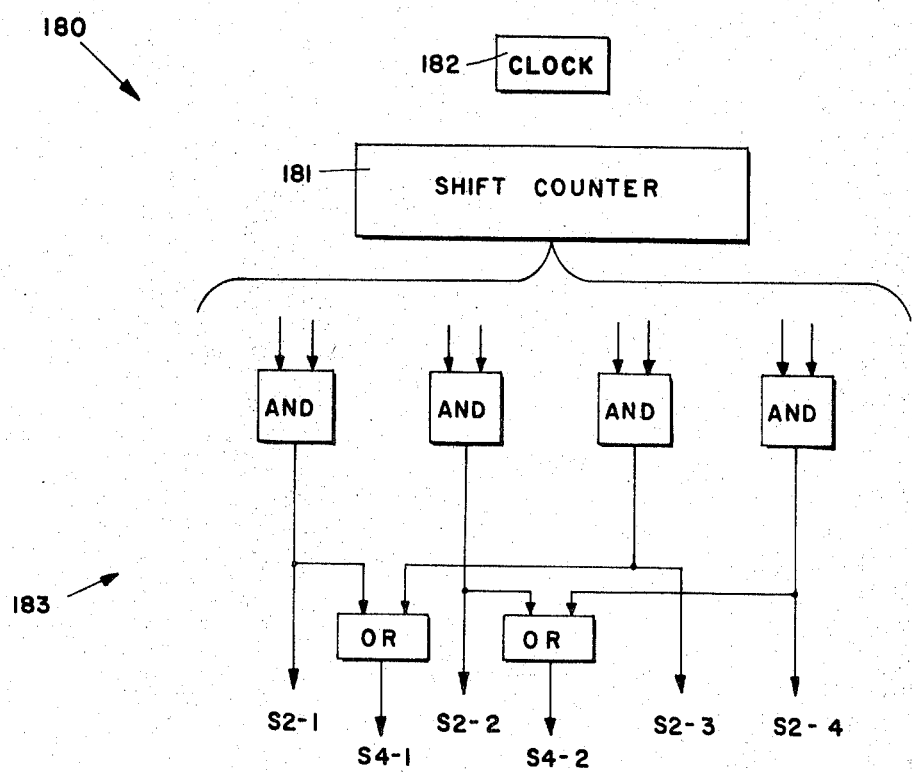
FIG. 9 is a block diagram showing a modified form of clock and distributor used in the FIG. 1 system.
Figure 10:
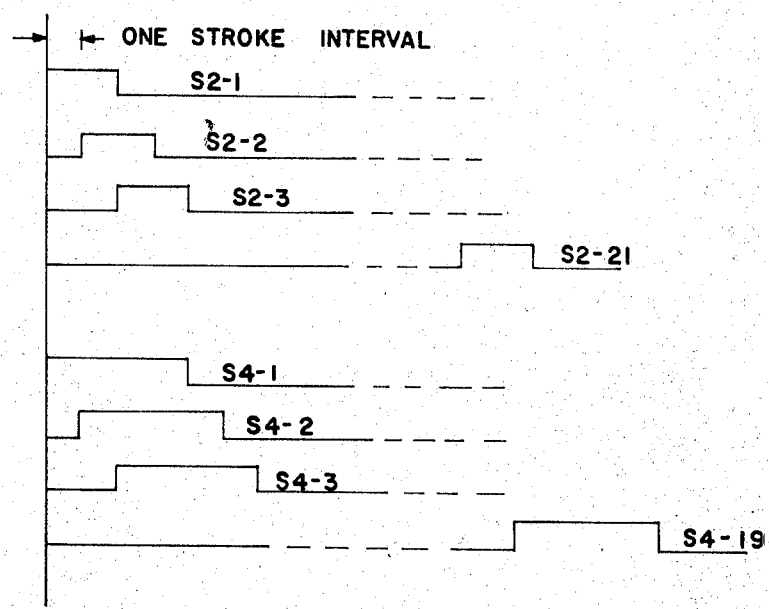
FIG. 10 shows graphs of timing signals generated by the FIG. 9 clock.

FIG. 9 shows a clock and distributor 180 using conventional components for generating sequences of timing signals "S" having durations of two- and four-stroke intervals. Distributor 180 employs a frequency dividing shift counter 181 which counts signals from a clock 182 to provide the requisite stroke countdown. A conventional logic section indicated at 183 responding to counter 181 gates out the different signals in sequence. In FIG. 9, the number immediately following "S" indicates the number of stroke units or intervals in the particular signal and the last number in the designation indicates its position in the timing sequence. Thus, S2–1 signifies a two-unit signal beginning with stroke one; S4–2 signifies a four-unit signal beginning with stroke two; and so on. The waveforms of some of these signals are indicated in FIG. 10. By using selected combinations of these two- and four-unit signals, strokes having lengths of one, two, three or four stroke intervals may be generated.

FIG. 11 shows a matrix indicated at 184 which responds to these different pulse width timing signals to generate the requisite inputs for ramp generators 52 and 57 and unblanking amplifier 62. As with the previous matrix embodiments, matrix 184 comprises a set of matrix sections 184–A, 184–B . . . 184–N . . . which correspond to the characters in the set selected for display. The signals from these various sections are applied via a matrix section 186 to control the vertical and horizontal deflection and blanking condition of the electron beam in tube 20 (FIG. 1).

Matrix sections 184–A, etc., are each composed of a set of AND gates 188 which are enabled by selected ones of the timing signals from clock and distributor 180 (FIG. 9). In FIG. 11, we have shown specifically the makeup of matrix section 184–A corresponding to the letter "A." It comprises a set of four AND gates 188–1, 188–5, 188–9 and 188–11, labeled in correspondence with the strokes with which they are associated.

The gates in matrix section 184–A are enabled by the timing signals from clock and distributor 180 which will produce the timed transitions in stroke direction and blanking condition called for by the FIG. 3A pattern. Thus, FIG. 3A shows that strokes 1–4 require the same stroke components, to wit, $(+x, +2y)$; also, these four strokes are all unblanked. Accordingly, the S4–1 timing signal, having a pulse width equivalent to four stroke intervals, is applied to gate 188–1. Consequently, this gate remains enabled from the beginning of stroke 1 until the end of stroke 4. The "A" pattern calls for a different stroke direction, i.e. $(+x, -2y)$ for the next four strokes 5–8. These strokes are also unblanked. Therefore, the four-unit S4–5 timing signal is applied to AND gate 188–5. Strokes 9 and 10 for still a different direction, to wit $(-x, +2y)$. Also, tube 10 is blanked during these strokes. Consequently, a two-unit timing signal S2–9 is applied to gate 188–9. The final transition takes place at the beginning of stroke 11 because the last two strokes 11 and 12 call for still a different direction, i.e. $(-2x, 0)$ and these strokes are unblanked. Therefore, a two-unit timing signal S2–11 is applied to gate 188–11 to effect these changes.

The output signals from the various matrix sections 184–A, etc., are applied to circuits 186a–186g in matrix section 186 corresponding to the six possible stroke components and unblanking control. These seven circuits 186a–186g control the ramp generators 52 and 57 and unblanking amplifier 62.

Each circuit 186 comprises a pair of OR circuits 190 and 192 to which the signals from matrix section 184–A, etc., are applied. The output from each OR circuit 190 is applied to one input terminal of a bistable circuit 194 comprising a flip-flop having gated inputs. The output from the OR circuit 190 is also applied to an input terminal of the corresponding OR circuit 192 through an inverter 193. The output of circuit 192 is then coupled to the other input terminal of bistable circuit 194 in the same circuit 186. The outputs of the circuits 186 are taken from the ZERO output terminals of their bistable circuits 194 and applied to integrators 52a–52d, 57a, 57b and amplifier 62, respectively. Bistable circuits 194 also receive $T_s$ timing signals and perform a reclocking function as is done in circuits 80a–80g in the FIG. 5 system.

Using the two- and four-unit timing signals S2 and S4 from clock and distributor 180 (FIG. 9), circuit 186a–186g can generate output signals having pulse widths corresponding to one, two, three or four strokes or stroke intervals.

Figure 12:
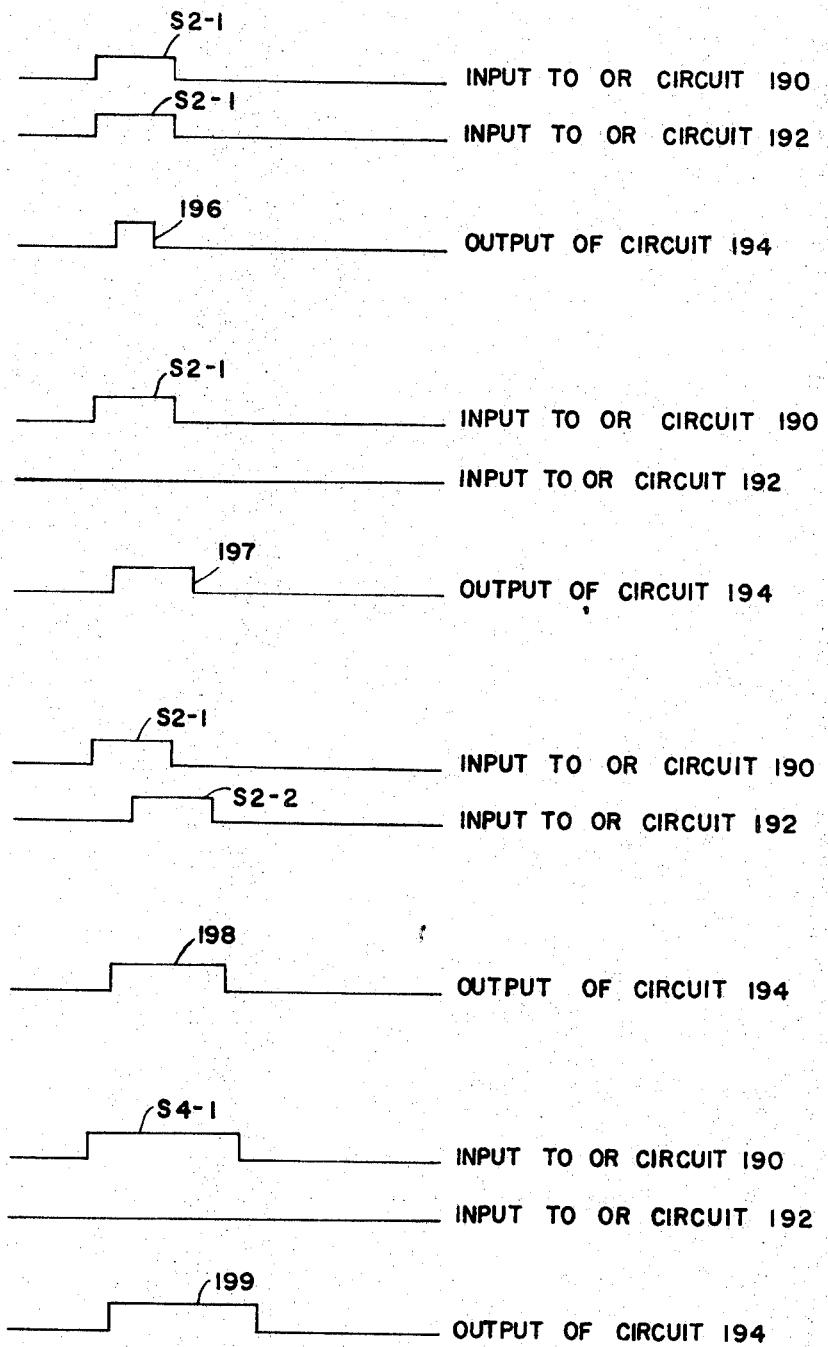
FIG. 12 shows graphs of several voltages plotted as a function of time showing the operation of the FIG. 11 matrix.

Referring to FIGS. 11 and 12, the operation of each circuit 186 is such that when a two-unit timing signal, e.g. the S2–1 signal, is applied simultaneously to its OR circuits 190 and 192, the bistable circuit 194 therein switches to the ONE state upon the occurrence of the first $T_s$ signal. At the next $T_s$ signal, circuit 194 switches back to the ZERO state. It thus generates a one-unit output signal shown by the curve 196 in FIG. 12 which commences approximately one-quarter microsecond after the beginning of the S2–1 signal. However, when the two-unit signal S2–1 is applied only to OR circuit 190, circuit 194 is not reset at the second $T_s$ signal. Consequently, the output of circuit 194 has, in this case, a two-unit pulse width as seen by curve 197.

On the other hand, when a pair of staggered two-unit timing signals, e.g. S2–1 and S2–2, are applied simultaneously to OR circuit 190, with no input signal to circuit 192, in a given circuit 186, the corresponding bistable circuit 194 switches to the ONE state at the first $T_s$ signal and remains there until the $T_s$ signal following the end of the second, i.e. the S2–2 signal. This circuit 194 generates an output signal having a pulse width of three stroke units as indicated by the curve 198. Finally, if a four-unit timing signal, e.g. S4–1, is applied only to OR circuit 190, in a circuit 186, the output signal from circuit 194 therein has a pulse width of four stroke units as seen by curve 199. This output signal commences at the $T_s$ signal following the beginning of the S4–1 signal.

Thus, referring again to FIG. 11, while two input signals from matrix 184 must be applied to each circuit 186 to generate a one or three stroke unit output signal, only a single input signal is needed to generate an output signal of two or four stroke units. Therefore, if a large number of characters in a set require straight segments composed of two or four contiguous strokes, then the FIG. 11 matrix requires fewer logic components than the matrices in FIGS. 5 and 8 to display the same characters.

Thus, in the example of the letter "A," the different segments comprising that character are maintained for either two or four stroke intervals. Therefore, only a single output signal from matrix section 184–A is required at the beginning of each of strokes 1, 5, 9 and 11 to effect all of the timed transitions called for by the "A" pattern (FIG. 3A). More particularly, AND gate 188–1 is connected to OR circuits 190 in circuits 186a, 186e and 186g. Also, AND gate 188–5 is connected to OR circuits 190 in circuits 186a and 186g. Similarly, AND gate 188–9 is coupled to OR circuit 190 in circuits 186b and 186e. Finally, AND gate 188–11 is connected to OR circuits 190 in bistable circuits 186d and 186g. As the S4–1, S4–5, S2–9 and S2–11 timing signals are applied in succession to the corresponding numbered gates 188 in matrix section 184–A, the system traces all the segments comprising the letter "A." Thus, a total of only four AND circuit 188 are required to display "A" as compared with the five required in the FIGS. 5 and 8 systems.

Since in the present example there is no requirement for maintaining the same stroke direction for one or three stroke intervals, only one signal is applied to each OR circuit 190 and no signals are applied to the various OR circuits 192. However, it should be understood that other matrix sections 184–B and 184–C, etc. corresponding to other characters in the set may require such connections.

The overall display system described herein is particularly suitable for use with several remote displays. More specifically, all of the elements of the system shown in FIG. 1 ahead of ramp generators 52 and 57 and unblanking amplifier 62 can be located in a central console. Then, using only seven electrical lines, the necessary control signals can be coupled to each display unit, which would contain the remaining elements of the system. This considerably simplifies the installation of these remote displays and also minimizes the cost thereof.

Referring again to FIG. 5, the number of electrical lines to the remote displays may be reduced even further by designing matrix 48 so that it generates only four output signals rather than six to represent the six possible vector components in the stroke repertoire. More particularly, although six input signals are required for integrators 52a–52d, 57a and 57b, only twelve combinations of these inputs are used corresponding to the twelve combinations of stroke components needed to form the twelve available strokes a–k and m (FIG. 2).

Using a binary code, four bits are sufficient to define these twelve stroke component combinations. Therefore, coded signals from only four bistable circuits 80a–80d in matrix 48 are sufficient to develop the twelve strokes a–k and m (FIG. 2). This means that only four electrical lines are needed to transmit these signals to each remote display. Then, at the displays, these four signals may be decoded using conventional coincidence circuits to develop the six input signals for integrators 52a–52d, 57a and 57b.

Table II below shows the twelve stroke component combinations obtainable from a matrix 48 employing only four circuits 80a–80d and the corresponding binary code for each one. The particular code shown requires a minimum of decoding logic. The "0" and "1" in the table indicate the presence of a signal at the ZERO or ONE output terminal of the flip-flop in the indicated bistable circuit.

TABLE II

| 80a | 80b | 80c | 80d | Stroke slope |
|---|---|---|---|---|
| 0 | 0 | 0 | 1 | $+2y$ |
| 1 | 0 | 0 | 1 | $+2y, -2x$ |
| 0 | 1 | 0 | 1 | $+2y, +2x$ |
| 1 | 1 | 0 | 1 | $+2y, +x$ |
| 0 | 0 | 1 | 1 | $+2y, -x$ |
| 1 | 0 | 0 | 0 | $-2y, -2x$ |
| 0 | 1 | 0 | 0 | $-2y, +2x$ |
| 1 | 1 | 0 | 0 | $-2y, +x$ |
| 0 | 0 | 1 | 0 | $-2y, -x$ |
| 1 | 0 | 1 | 0 | $-2x$ |
| 0 | 1 | 1 | 0 | $+2x$ |
| 0 | 0 | 0 | 0 | $-2y$ |

Thus, it is apparent from the foregoing that the present invention provides an efficient way of displaying a frame of complex characters. Since the system generates a distinctive stroke pattern for each character in the frame as opposed to a fixed stroke pattern for all characters in the frame, each character is traced with a minimum number of strokes. Also, the present system is relatively inexpensive because it requires a minimum number of components and connections, yet it is capable of forming high-quality characters. Moreover, it is versatile and easily modified to handle different character sets, this being just a matter of changing plug-in modules in the various matrices.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language might be said to fall therebetween.

Having described the invention, what is claimed as new and secured by Letters Patent is:

1. Stroke selection apparatus in combination with display apparatus in which symbols composed of a string of strokes chosen from a repetition of strokes extending in various directions are traced on a display surface during symbol trace intervals in response to symbol identifying instructions which enable said stroke selection apparatus to produce for each symbol to be traced sequences of digital signals indicative of the slopes and blanking condition of incremental tracing motions; wherein said stroke selection apparatus comprises:

(A) stroke timing means for producing a sequence of stroke interval timing signals for each symbol tracing interval;

(B) a plurality of networks each receiving a different one of said stroke timing signals and each network being enabled to produce a control signal in coincidence with the associated stroke timing signal by those symbol identifying instructions which require during like stroke intervals any of the following: start or end of stroke, change in stroke direction and change in blanking; and (C) means for combining the control signals produced by said networks to form said sequences of digital signals, the duration of at least one of said digital signals corresponding to the number of consecutive strokes comprised of a vector component of an incremental tracing motion.

2. A character display system as defined in claim 1 wherein:

(A) said timing signal generating means generates timing signals having different durations; and (B) each of said networks develops a control signal whose duration corresponds to the duration of the timing signal applied to that gate so that the same conditions of stroke direction and blanking are maintained for a number of strokes corresponding to the duration of said timing signal.

3. A character display system as defined in claim 2 wherein said timing signal generating means comprises:

(A) a clock for generating timing pulses whose duration corresponds to the length of each stroke;

(B) a shift connected to receive said pulses from said clock; and (C) decoding means responsive to signals from said shift counter for generating sequences of pulses on different lines, the pulses in the different sequences having durations which are integral multiples of the duration of said clock pulses.

4. A character display system as defined in claim 1: wherein said combining means includes a set of bistable circuits, each of said bistable circuits being controlled by the control signals from selected ones of said networks to produce said digital signal sequences, the durations of said digital signals corresponding to the time intervals between successive pairs of stroke timing signals applied to those networks which control that bistable circuit.

5. A character display system as defined in claim 4 wherein each of said bistable circuits comprises:

(A) a flip-flop having gated input terminals arranged so that alternate control signals applied by said networks to said input terminals varies said output signal from said flip-flop between two D.C. levels; and (B) means for terminating the signal from said flip-flop at the end of each complete cycle of said timing signal generating means.

6. The invention according to claim 4:
wherein the digital sequence produced by a first one of said bistable circuits corresponds to the blanking condition of a symbol trace; and
wherein the display of one or more of said symbols requires visibly tracing only certain strokes in the stroke patterns of said one or more symbols.

7. The invention according to claim 6:
wherein the digital signal sequences produced by second and third ones of said bistable circuits correspond to different lengths of a vectorial component of said incremental tracing motions; and
wherein first ramp generator means responds to the digital sequences produced by said second and third bistable circuits to provide a first ramp signal, the slopes of which denote stroke length and direction.

8. The invention according to claim 7:
wherein the digital sequences produced by fourth and fifth ones of said bistable circuits correspond to another vectorial component of said incremental motions; and
wherein second ramp generator means responds to the digital signal sequences produced by said fourth and fifth bistable circuits to provide a second ramp signal, the slopes of which denote stroke length and direction.

9. The invention according to claim 8:
wherein each of said networks includes a number of coincidence gates which number is equal to the number of different strokes required during the associated stroke interval by the symbol set.

10. A character display system as defined in claim 9 and further including means for detecting the cessation of signals from said stroke selection means, said detecting means controlling said instruction providing means so that it immediately provides the instruction for tracing the next character in the set.

11. The invention according to claim 10:
wherein said display surface is the screen of a cathode ray tube having horizontal and vertical deflection means responsive to said first and second ramp signals and intensity control means responsive to the output of said first one of the bistable circuits to trace symbols on said screen.

12. A character display system comprising:
(A) a cathode ray tube including:
  (1) beam deflection means; and
  (2) beam blanking means;
(B) means for providing character-identifying instructions for tracing on the tube screen characters composed of arrays of line segments,
  (1) each segment comprising one or more consecutive strokes selected from a repertoire of strokes; and
  (2) selected ones of which segments must be visibly traced on the screen to display a character;
(C) means for generating sequences of timing signals; the signals in each sequence corresponding to a line segment length equal to a selected number of strokes;
(D) stroke selection means operative in response to each instruction;
(E) means for applying selected signals from said sequences to said selection means so as to develop control signals, each control signal corresponding to a complete segment in the array for a character; and
(F) means responsive to said control signals for developing deflection signals for said deflection means, said deflection signals corresponding to all the segments in the array for each character.

13. A character display system as defined in claim 12 wherein:
(A) some of said control signals correspond to said selected segments; and
(B) further including means for applying said control signals so as to control said blanking means whereby only said selected segments are visibly traced on the tube screen.

14. A character display system as defined in claim 13 wherein said generating means comprises:
(A) a clock for generating timing pulses, each of whose duration corresponds to the length of each stroke;
(B) a counter connected to receive pulses from said clock; and
(C) decoding means responsive to signals from said counter for generating said sequences of timing signals, the signals in the different sequences being composed of pulses having durations which are integral multiples of the duration of each clock pulse.

15. A character display system as defined in claim 12:
(A) wherein said generating means generates timing signals corresponding to line segment lengths of only two and four strokes; and
(B) including also means in said stroke selection means responsive to selected timing signals for developing control signals corresponding to segment lengths of one and three strokes.

References Cited

UNITED STATES PATENTS

| | | | |
|---|---|---|---|
| 3,161,866 | 12/1964 | Orenstein et al. | 340—324 |
| 3,205,488 | 9/1965 | Lumpkin | 340—324 |
| 3,283,317 | 11/1966 | Courter | 340—324 |
| 3,320,595 | 5/1967 | Yanishevsky | 340—324 X |
| 3,329,948 | 7/1967 | Halsted | 340—324 |
| 3,335,415 | 8/1967 | Conway | 340—324 |

DONALD J. YUSKO, Primary Examiner

D. L. TRAFTON, Assistant Examiner

PO-1050
(5/69)

UNITED STATES PATENT OFFICE
CERTIFICATE OF CORRECTION

Patent No. 3,533,096      Dated 10/6/70

Inventor(s) Richard J. Bouchard

It is certified that error appears in the above-identified patent and that said Letters Patent are hereby corrected as shown below:

Column 1 Line 4 "J" should be --H--; Column 1 Line 68 "Theerfore" should be --Therefore--.
Column 9 Line 25 delete "are applied to bistable circuits 80-80g".
Column 10 Line 44 "is" should be --it--.
Column 18 Line 37 after "shift" insert --counter--.

Signed and sealed this 6th day of April 1971.

(SEAL)
Attest:

EDWARD M. FLETCHER, JR.
Attesting Officer

WILLIAM E. SCHUYLER, JR.
Commissioner of Patents